United States Patent
Koreeda et al.

(10) Patent No.: US 10,834,172 B2
(45) Date of Patent: *Nov. 10, 2020

(54) DOWNLOAD CONTROL DEVICE

(71) Applicant: Maxell, Ltd., Kyoto (JP)

(72) Inventors: Hiroyuki Koreeda, Fujisawa (JP); Satoshi Mio, Yokohama (JP)

(73) Assignee: Maxell, Ltd., Kyoto (JP)

(*) Notice: Subject to any disclaimer, the term of this patent is extended or adjusted under 35 U.S.C. 154(b) by 133 days.

This patent is subject to a terminal disclaimer.

(21) Appl. No.: 16/224,914

(22) Filed: Dec. 19, 2018

(65) Prior Publication Data
US 2019/0124136 A1    Apr. 25, 2019

Related U.S. Application Data

(63) Continuation of application No. 15/403,596, filed on Jan. 11, 2017, now Pat. No. 10,200,449, which is a (Continued)

(30) Foreign Application Priority Data

Apr. 20, 2007 (JP) ................. 2007-111200

(51) Int. Cl.
*H04L 29/08* (2006.01)
*G06F 16/958* (2019.01)

(52) U.S. Cl.
CPC ............ *H04L 67/06* (2013.01); *G06F 16/958* (2019.01); *H04L 67/325* (2013.01); *H04L 67/02* (2013.01)

(58) Field of Classification Search
CPC ....... H04L 67/06; H04L 67/325; H04L 67/02; G06F 17/3089
See application file for complete search history.

(56) References Cited

U.S. PATENT DOCUMENTS 5,862,325 A   1/1999  Reed et al.
7,203,760 B2  4/2007  Shimada
(Continued)

FOREIGN PATENT DOCUMENTS

CN      1698377 A    11/2005
JP   2001-051928 A    2/2001
(Continued)

OTHER PUBLICATIONS

Red Cruise Corp., "RSS Media Business Saizensen Denshi Mail, Web ni Tsuzuku Dai San no Internet Media", Internet magazine make innovation with technology; No. 127, Aug. 1, 2005; p. 44-71.
(Continued)

*Primary Examiner* — Ranodhi Serrao
(74) *Attorney, Agent, or Firm* — Mattingly & Malur, PC

(57) ABSTRACT

When download operations get started in unison in conformity to RSS metafile delivery time-and-date information, the traffic is temporarily concentrated to a server, resulting in the risk of a system failure or else. In addition, it is inevitable to periodically check whether an RSS file on Web server is updated or not; so, users must delete update-unnecessary RSS files from those objects to be monitored. In view of this, the periodical update check timing of download control information is dispersed, thereby scattering download requests to the server. The download control information is provided with the information indicating whether such download control information is put under update management and/or expire time-and-date information in case the update management is to be done, whereby an information processing apparatus performs, based on the information, erase processing of the download control information when the download processing is completed.

1 Claim, 8 Drawing Sheets

Related U.S. Application Data continuation of application No. 12/596,517, filed as application No. PCT/JP2008/053269 on Feb. 26, 2008, now Pat. No. 9,576,063.

(56) References Cited

U.S. PATENT DOCUMENTS

| | | |
|---|---|---|
| 7,752,643 B2 | 7/2010 | Ito et al. |
| 8,108,362 B2 | 1/2012 | Hydrie et al. |
| 2006/0025875 A1 | 2/2006 | Smith et al. |
| 2006/0095543 A1 | 5/2006 | Ito et al. |
| 2006/0212943 A1 | 9/2006 | Kitazato et al. |
| 2007/0061282 A1 | 3/2007 | Ganguly et al. |
| 2007/0143390 A1 | 6/2007 | Giambalvo et al. |
| 2008/0189099 A1 | 8/2008 | Friedman et al. |

FOREIGN PATENT DOCUMENTS

| | | | |
|---|---|---|---|
| JP | 2002-073455 | A | 3/2002 |
| JP | 2002-202927 | A | 7/2002 |
| JP | 2003-208376 | A | 7/2003 |
| JP | 2004-246822 | A | 9/2004 |
| JP | 2005-006203 | A | 1/2005 |
| JP | 2006-99341 | A | 4/2006 |
| JP | 2006-244336 | A | 9/2006 |
| JP | 2006-350500 | A | 12/2006 |
| JP | 2006-350746 | A | 12/2006 |

OTHER PUBLICATIONS

Office Action issued in Japanese Patent Application No. 2011-156265 dated Aug. 28, 2012.

DOWNLOAD CONTROL DEVICE

INCORPORATION BY REFERENCE

This application is a continuation of U.S. patent application Ser. No. 15/403,596, which is a continuation of U.S. patent application Ser. No. 12/596,517, filed Nov. 27, 2009, now U.S. Pat. No. 9,576,063, which relates to and claims priority from Japanese Patent Application No. 2007-111200 filed Apr. 20, 2007, the entire disclosure of which is incorporated herein by reference.

TECHNICAL FIELD

The technical field relates to a download control apparatus which controls the downloading of contents, such as data, programs and others.

BACKGROUND ART

Regarding the above-noted technical field, Patent Document 1, for example, is aimed at a challenge for "enabling an information distributor to continuously perform information delivery to registered users" and contains a written description as to the solution means thereof, which reads as follows: "An information delivery system comprises a transmission site 30 which transmits delivery information containing therein date information that is written in a specified format, an information delivery server 20 capable of acquiring the delivery information from each transmission site 30, and an information terminal 10 which acquires delivery information from the information delivery server 20. The information terminal 10 has a display means 14 capable of displaying a calendar browser 40 that displays delivery information in a calendar-like form, a mark generation means 16 which extracts date information from the delivery information acquired from the information delivery server 20 and which displays an information mark 47 indicative of the arrival of delivery information in a corresponding data column of the calendar browser 40 corresponding to the date information, and a display changeover means 17 which is responsive to selection of the date column with the information mark 47 being displayed, for switching to a content display screen that displays the contents of the delivery information as included in such selected date column. Thus provided is a contents delivery system capable of promptly delivering only high-necessity contents by taking account of the degree of necessity of a user on a per-content basis."

Patent Document 1: JP-A-2006-350746.

DISCLOSURE OF THE INVENTION

Problems to be Solved by Invention

As broadband Internet services become popular, a service for delivering via the Internet those contents attracts increasing attention, which contents include videos, photos, music, multimedia data and application programs.

When purchasing and downloading these various kinds of contents, an Internet browser is utilized in an information processing apparatus, such as PC or the like, whereby the user uses an operation device to indicates contents that are linked from HTML contents to thereby perform purchasing and downloading operations.

At this time, in order to improve the convenience of such download of contents, it is desirable to provide a function which enables all-at-once downloading of a great number of contents, successive download of periodically delivered contents, and update of downloaded contents upon delivery of a new version of contents.

To provide this download function, a tag language of XML format, called RSS (RDF Site Summary) which is also recited in the above-noted patent document 1, is sometimes used as standardized download control information. In one RSS file, a title or name of the RSS file per se and its location on the Internet (URL) are written while letting a plurality of pieces of information necessary for contents downloading, called the items, be described therein. More specifically, there are recited the title of contents to be downloaded, data type, size, download destination (URL), delivery time-and-date, etc.

RSS files are put on a Web server, for example. An information processing apparatus is responsive to receipt of an instruction through a user's operation, for reading an RSS file which is linked from HTML contents to thereby perform downloading of the contents that are recited in the RSS file in accordance with the description of a metafile.

However, in the Patent Document 1 and such downloader application, prior known RSS-based download control schemes are faced with problems which will be described below.

Firstly, in accordance with the RSS metafile delivery time-and-date information, information processing apparatuses complying with such metafile begin to perform download operations in unison, resulting in the traffic being temporarily concentrated to a server, which leads to the occurrence of operation failures, such as system down or the like. Especially, in cases where the information processing apparatus is home-use equipment that is designed to download home movies (e.g., a television set, recorder or else), the contents are videos so that these are large in capacity and, simultaneously, are large in number due to consumer use; thus, risks are worried in particular.

In addition, the use of such RSS file raises a need for the information processing apparatus to periodically check whether the RSS file on Web server is updated or not. Contents include update-unnecessary ones and those which are updated by a certain time of year but are no longer updated after the time. As far as these contents are concerned, the information processing apparatus is unable to know the presence or absence of an update event in future. For this reason, a user who uses the information processing apparatus is required to make his or her own decision by using information available from a service provider and perform deletion of an unnecessary RSS file from those objects to be monitored. This would result in an increase in complexity of user's manual operations and/or waste of network traffic.

Means for Solving Problems

Consequently, the periodical update check time of download control information is dispersed to thereby scatter download requests as sent to a server, for example.

Additionally, the download control information is arranged so that it is provided with information indicative of whether such download control information performs update management and/or time-and-date information of an update time limit in the case of the update management being performed, thereby permitting the information processing apparatus to perform, based on these information items, the erase processing for deletion of the download control information upon completion of download processing.

Advantageous Effects of Invention

According to the above-stated means, it is possible to avoid the traffic concentration, for example. It is also possible to perform appropriate update processing with respect to each of one-shot (only one time) delivered contents and a series of contents which are delivered periodically or opportunistically.

These and other objects, features and advantages of the invention will be apparent from the following description of an embodiment of the invention, as illustrated in the accompanying drawings.

BEST MODE FOR CARRYING OUT THE INVENTION

Figure 1:
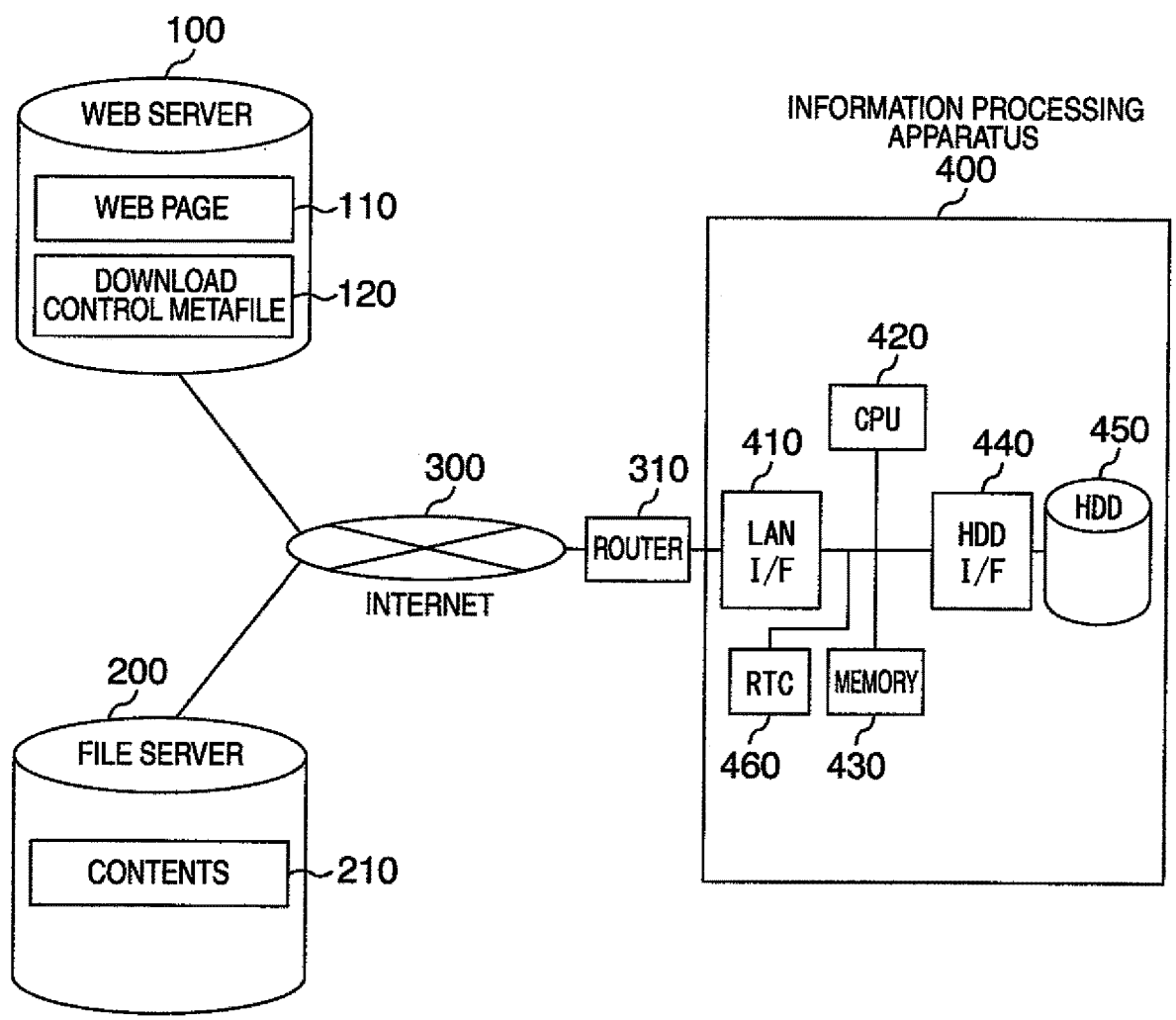
FIG. 1 A block diagram showing a configuration example of an information processing apparatus and system.

An example of preferred form (embodiment) of this invention will be explained with reference to figures of the drawing. Note here that this invention should not be limited to this embodiment.

FIG. 1 shows the relationship of an information processing apparatus 400 and its related system.

In the information processing apparatus 400, a CPU 420 executes a program(s) that is stored in a memory 430 or HDD 450 to thereby execute various kinds of processing tasks. Examples of the information processing apparatus 400 are a television set, recorder, personal computer or else, which has a recording function with connection to a network.

The information processing apparatus 400 has a real time clock (RTC) 460 and thus holds a real time in any events, which can be referred from the above-noted program; so, it has the timer function for causing the CPU 420 to execute a program at any designated time of a day.

In addition, a hard disk drive (HDD) is connected through a hard disk interface (HDD I/F) 440 so that the above-noted program is able to perform read/write processing of a large capacity of data.

Additionally, it is connected to a router (this may be a gateway or else, which will also be collectively called the repeater device) 310 via a network interface (LAN I/F) 410 and thus is linked to the Internet 300. Servers which are accessible via the Internet include a Web server 100 and a file server 200.

The Web server 100 retains a Web page 110 to which reference is made in order to perform display by Web browsing function owned by the information processing apparatus 400 and a download control metafile 120 which describes control information needed for the information processing apparatus 400 to download various contents. It also has a hardware configuration, such as the information processing apparatus 400; for example, CPU executes a program that is stored in a memory or HDD to thereby perform various kinds of processing tasks.

In the file server 200, a main body of data of contents 210 to be downloaded is put. It also has a hardware configuration, such as the information processing apparatus 400; for example, CPU executes a program that is stored in a memory or HDD, thereby to perform various kinds of processings.

When a request for acquisition of contents is sent from the information processing apparatus 400 to the file server 200, data of such contents is delivered via the Internet; by recording it to the HDD via the HDD I/F 440, a downloading session is completed.

A more detailed example is as follows: first, after authentication of ID of the information processing apparatus 400 (or a user) is executed at a service provider, the Web server 100 acquires an HTML Web page. Upon execution of purchase processing of a package (contents) by use of such Web page, both the ID of such package (contents) and ID of information processing apparatus (or user) are sent to an accounting server for management of clients, followed by execution of billing. After completion of the billing, a download control metafile is downloaded from the Web server 100 to the information processing apparatus 400. In accordance with this download control metafile, the package (contents) is downloaded from the file server 200. When playing back the package (contents) thus downloaded, a playback control metafile or DRM key data or contents metadata is acquired if need arises.

Note here that the apparatuses which control download, such as the information processing apparatus 400 and servers 100 and 200, are collectively called the download control apparatus.

Figure 2:
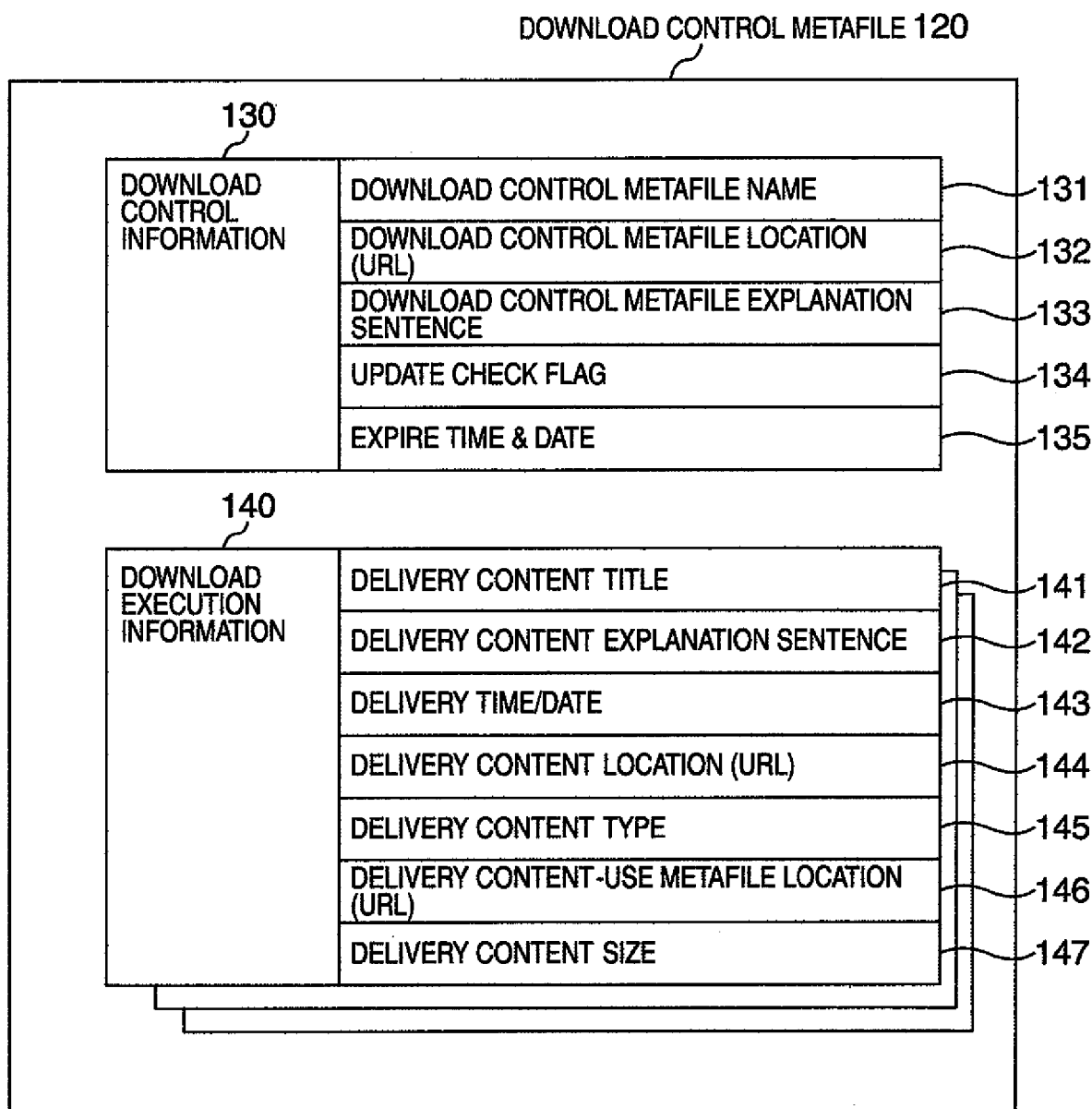
FIG. 2 A data diagram showing a configuration example of download control metafile.

FIG. 2 shows a configuration example of the download control metafile 120. The download control metafile 120 contains download control information 130 which describes the contents of the metafile per se, and download execution information 140 which is used to download one or a plurality of contents. This download control metafile 120 is generated at the Web server 100, for example, including download control information 130, download execution information 140 and various kinds of data groups as shown in FIG. 2 in greater detail. This generating part (e.g., the unit for executing a program in CPU of Web server) is also referred to as a download control metafile generation unit.

This download control metafile 120 is described by RSS, as an example. Although the download control metafile is creatable (preparable) for a plurality of given contents within a package, it does not bridge between a plurality of packages. It is also possible to prepare a plurality of ones for a certain package. Note however that the metafile is prepared without fail in such a way that all the contents within a package are downloadable. The download control metafile 120 is updated from time to time; in view of this, a transmitter checks in a predetermined length of time cycle and updates a difference, if any. In the case of RSS, an enclosure url is used to perform discrimination between respective contents.

The download control information 130 has a download control metafile name 131 which indicates the title of a corresponding download control metafile 120 (e.g., download reservation title, file name, ID, etc.), a download control metafile location 132 which indicates the location of a corresponding download control metafile 120 (e.g., URL of a Web site on the Internet that provides download reservation, which may alternatively be an address that is not limited to URL—the same will be true on the location below), a download control metafile explanation sentence 133 which indicates an explanation of a corresponding download control metafile 120 (e.g., explanation as to download reservation, language type, etc.), an update check flag 134, and an expire time-and-date 135.

The update check flag 134 is a flag which is for determining whether the download control metafile 120 on the Web server 100 is changed in content and whether periodical check is performed or not. The flag takes a value of "Update" indicating the need to perform checking or a value of "One Shot" indicating elimination of periodical check after first acquisition. The expire time/date 135 is effective in the case of the update check flag 134 being set to "Update," in which are recited the date and hour of a time limit of continuing to check the update of the download control metafile 120.

The expire time/date 135 indicates a time limit of the update surveillance of contents. The unit of such time limit is arbitrarily settable (in units of dates, hours or minutes). It can also take a value indicating "No Time Limit," i.e., semipermanently continuing to check.

In addition, as another embodiment, a special value (e.g., all zeros) of the expire time/date 135 is handled as the value indicating the "One Shot" of the update check flag 134, thereby making it possible to realize an arrangement which omits the update check flag 134.

The download execution information 140 is such that a plurality of ones are describable in the download control metafile 120. For each set of contents to be downloaded, it stores several information, such as a delivery content title 141 which indicates the title of such content (this may be a TV program title or, alternatively, a file name or ID), an explanation sentence 142 of the delivery content which indicates an explanation of such content (such as features, remarks, etc.), a delivery time-and-date 143 indicating a date and hour for delivery of such content (this may be in units of days or minutes), a delivery content location 144 which indicates the location of such content, a category/type 145 of delivery content, a delivery content-use metafile location 146 which indicates the location of a metafile corresponding to such content, and a size 147 of the delivery content.

Although the delivery time/date 143 is usually arranged to describe the time and date on which content is stored in the file server 200 and laid open to the public, a delivery-scheduled time-and-date in future may alternatively be recited in the delivery time/date 143 in cases where the content is not laid open yet when the download control metafile 120 is delivered. In case once-delivered content are updated in content, a time and date of such updating are recited in the delivery time/date 143.

The delivery content file type 145 is for recitation of the category or type of a video, photo, music, program, multimedia data or else. The video may be further divided into more detailed ones, such as movies, news, sports and others whereas the music is further categorizable into several ones, such as classical music, rock, jazz, etc., the types of which may be recited therein.

The delivery content-use metafile is the attribute information that is needed for playback or execution of contents. One example of it is genre/keyword information for use in search of contents. Another example in the case of the content being video information is thumbnail or chapter information thereof.

It is noted that all or part of the download control metafile 120 and the download control information 130 and the download execution information 140 will be called the download control data.

Figure 3:
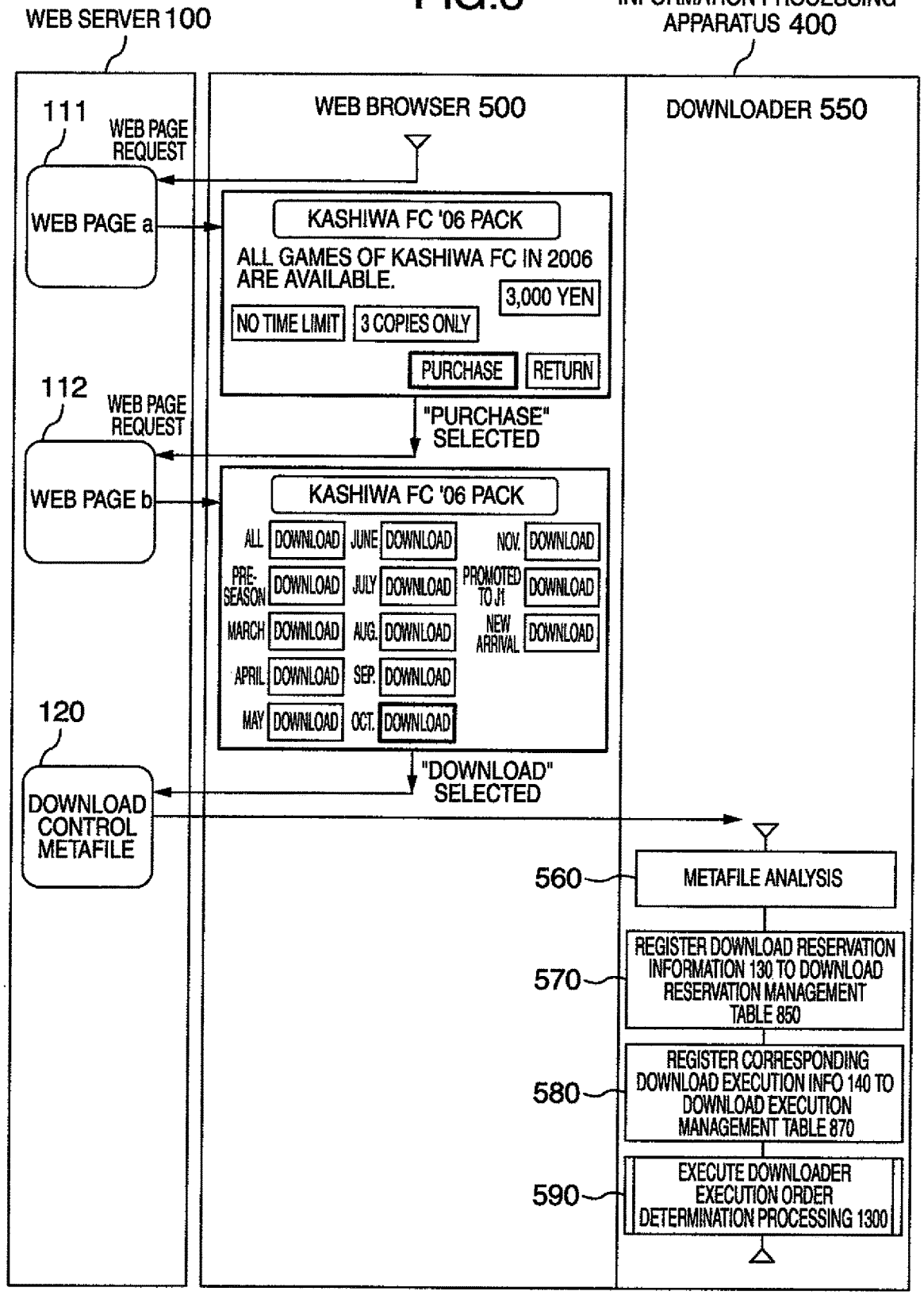
FIG. 3 A flow diagram showing an example of processing sequence of Web server and information processing apparatus.

FIG. 3 shows an example of a procedure which permits the information processing apparatus 400 to acquire the download control metafile 120.

A program of the Web browser 500 which is executed by the information processing apparatus 400 (this will be simply referred to hereinafter as Web browser 500) performs a request for acquisition of a Web page with respect to the Web server 100 and then displays the Web page acquired. In FIG. 3, first of all, a Web page a 111 (for example, including HTML and a display screen which displays titles of contents, such as a pack, cinema, TV program, music, etc.) is displayed; then, a user operates the contents by an operation device, such as a remote controller, and when selecting a button "Purchase," a Web page b 112 which is link-recited at the "Purchase" button is acquired and displayed on the Web page a 111. In the example of FIG. 3, a display screen is shown as the Web page a 111, which displays a pack title "Kashiwa FC '06 Pack," price "3,000 yen," a message saying "All games of Kashiwa FC in 2006 are available," a set of viewing/listening and copying conditions "No limits" and "3 Copies," and buttons named "Purchase" and "Return." Additionally a screen is shown as the Web page b 112, which displays a TV program title "Kashiwa FC '06 Pack" and an ensemble of buttons for choosing contents to be downloaded from this pack (e.g., when choosing "All," all contents included in the pack are downloaded; when selecting "June," contents corresponding to June are downloaded). On this Web page, every download button is provided with its own download control metafile 120 which describes contents to be downloaded, with a link defined thereto. Upon selection of the "Kashiwa FC '06 Pack," a download control metafile 120 is acquired, which contains download control information 130 that includes "Kashiwa FC '06 Pack" as the title 131 and download execution information 140 corresponding to a respective one of all games of Kashiwa FC in 2006 (if the game number is 50 then there are 50 items of download execution information 140), for example. Alternatively, upon selection of "March," a download control metafile 120 is obtained, which contains download control information 130 that includes "Kashiwa FC '06 Pack March" as the title 131 and download execution information 140 corresponding to a respective one of all games of Kashiwa FC of March in 2006 (if the game number is 5 then there are 5 sets of download execution information 140), for example (the Web server 100 transfers, and information processing apparatus 400 receives).

On this Web page b 112, when the user chooses the "Download" button, the Web browser 500 issues to the Web server 100 a request for sending the download control metafile 120 which is link-recited at the "Download" button. Upon receipt of the download control metafile 120, the Web browser 500 passes such data to a downloader 550 (a program of the downloader 550 to be executed by the information processing apparatus 400).

The downloader 550 analyzes the content of this passed download control metafile 120 (at 560) and registers the download reservation information 130 recited therein to a download reservation management table 850 which will be explained in FIG. 4 (570), and then registers its corresponding download execution information 140 to a download execution management table 870 which will be explained in FIG. 4 (580). Thereafter, it executes a download execution order determination processing 1300 which will be described later in FIG. 7 (590).

Figure 4:
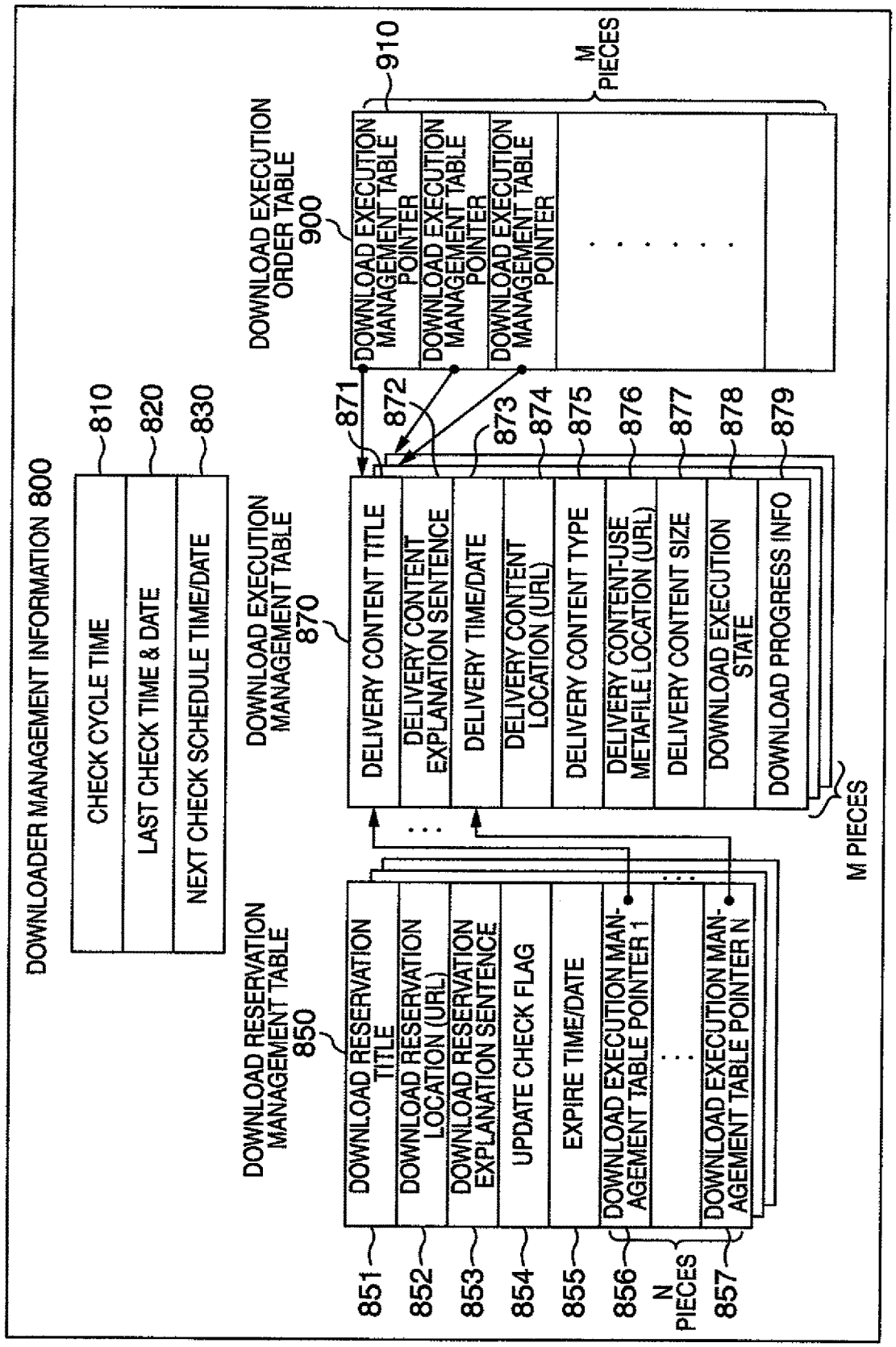
FIG. 4 A data diagram showing a configuration example of downloader management information.

FIG. 4 shows a configuration example of a database which is under management of the downloader 550.

Downloader management information 800 is the information that the downloader 550 manages timings of checking update of the download control metafile 120. Check cycle information 810 is, for example, a predetermined check cycle time to be set by users. Last check time-and-date 820 is the information indicative of the date and hour of a check that was last performed in a periodical check event. Next check schedule time-and-date 830 is the data and hour that was determined by adding the check cycle information 810 to the last check time/date 820; by setting this value to a timer of the RTC 460, it is possible to check update of the download control metafile 120 at a time equal to the next check schedule time/date 830.

The download reservation management table 850 is a table for management of download reservation corresponding to the download control metafile 120 that is instructed by the Web page b 112 of FIG. 3. It has a download reservation title 851, download reservation location 852, download reservation explanation sentence 853, update check flag 854 and expire time/date 855, in which are respectively stored the download control metafile name 131, download control metafile location 132, download control metafile explanation sentence 133, update check flag 134 and expire time/date 135 of the download control information 130.

The download execution management table 870 is a table for management of download execution situations with respect to respective contents. It has a delivery content title 871, delivery content explanation sentence 872, delivery time-and-date 873, delivery content location 874, delivery content type 875, delivery content-use metafile location 876 and delivery content size 877, in which are respectively stored a delivery content title 141, delivery content explanation sentence 142, delivery time-and-date 143, delivery content location 144, delivery content type 145, delivery content-use metafile location 146 and delivery content size 147 of the download execution information 140 of the download control metafile 120 of FIG. 2, which was imported.

A download execution state 878 has several values of "Not Executed," "Downloading," "Downloaded" and "Halt State" and is used by the downloader 550 in order to manage the download execution state. Download progress information 879 is the information that is used to manage the degree of progress of a download operation; as an example, it serially stores a size of download-completed contents. In this case, by obtaining a ratio of it to the delivery content size 877, it is possible to display the download progress degree to the user in percentage (%), for example. At this time, in case the download execution state 878 is set to "Not Executed," the download progress information 879's value stays at zero; in the case of "Downloaded," the value of download progress information 879 is set equal to the delivery content size 877.

An appropriate number (M) of download execution management tables 870 are prepared, which number corresponds to the number of download-manageable contents.

In download execution management table pointers (1 856 to N 857) of the download reservation management table 850, the location of the download execution management table 870 (such as an address within HDD 450 or an address of the memory 430) is stored. N is the number of importable download execution information 140, which is different depending on a system design employed.

A download execution order table 900 is the table that the downloader 550 manages the priority degree of download execution. It includes an array of M pointers 910 relative to the download execution management table 870. Let this array be in an execution order, for example. The execution order is determined by the download execution order determination processing 1300.

The part that records the download control metafile in this way (e.g., HDD or memory) will also be called the download control metafile recording unit.

Figure 5:
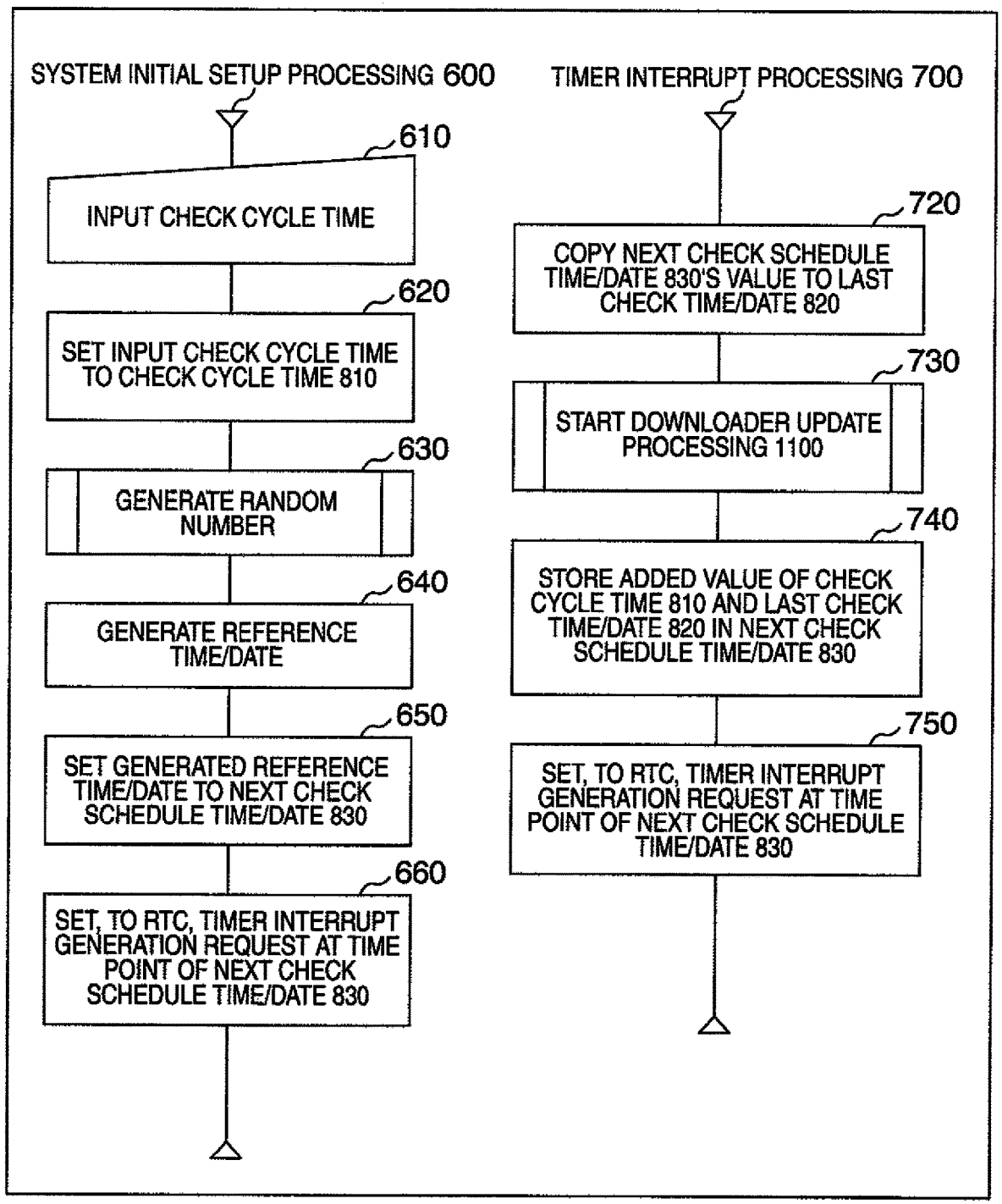
FIG. 5 A flow diagram showing an example of system initial setup processing and timer interrupt processing.

FIG. 5 shows a processing example to be performed by the downloader 550.

It is a system initial setup processing 600 of FIG. 5 that is performed in the information processing apparatus 400. Here, first, an input of a download control metafile check cycle is received from the user by means of the remote controller or else (at 610). For example, the user is expected to input information at time intervals on a per-day or per-hour basis. The input check cycle time is set in a field of check cycle time 810 (620). Next, a random number is generated in such a way as to cause every information processing apparatus 400 to generate a different value (630); then, based on such value, a reference time-and-date for checking the first download control metafile is generated (640). The initial setup may be done in such a manner that the check cycle time is fixed in the absence of reception of the user's setup or, alternatively, it is variably set up by the user.

The time-and-date information thus generated is stored in the next check schedule time/date 830 (650); then, a timer interrupt generation request of the time point of the next check schedule time/date 830 is set in the RTC 460 (660).

It is a timer interrupt processing 700 that is executed after having set up the timer interrupt generation request at 660.

At 660, when it becomes the time point that is set by the timer, the timer interrupt processing 700 of FIG. 5 is executed. The timer interrupt processing 700 is such that the value of the next check schedule time/date 830 is copied to the last check time/date 820 (720) to thereby execute a download update processing 1100 (730).

Thereafter, a value obtained by adding the check cycle time 810 to the last check time/date 820 is stored in the next check schedule time/date 830 (740); then, the timer interrupt generation request of the time point of the next check schedule time/date 830 is set in the RTC 460 (750). Whereby, the timer interrupt processing 700 is performed in accordance with the check cycle time 810; so, it is possible to check update of the download control metafile 120 in a fixed time cycle that was designated by the user, for example.

The part that sets up the update check timing (e.g., a part of the CPU which is executed by a program) in this way will also be called the check timing setup unit.

Figure 6:
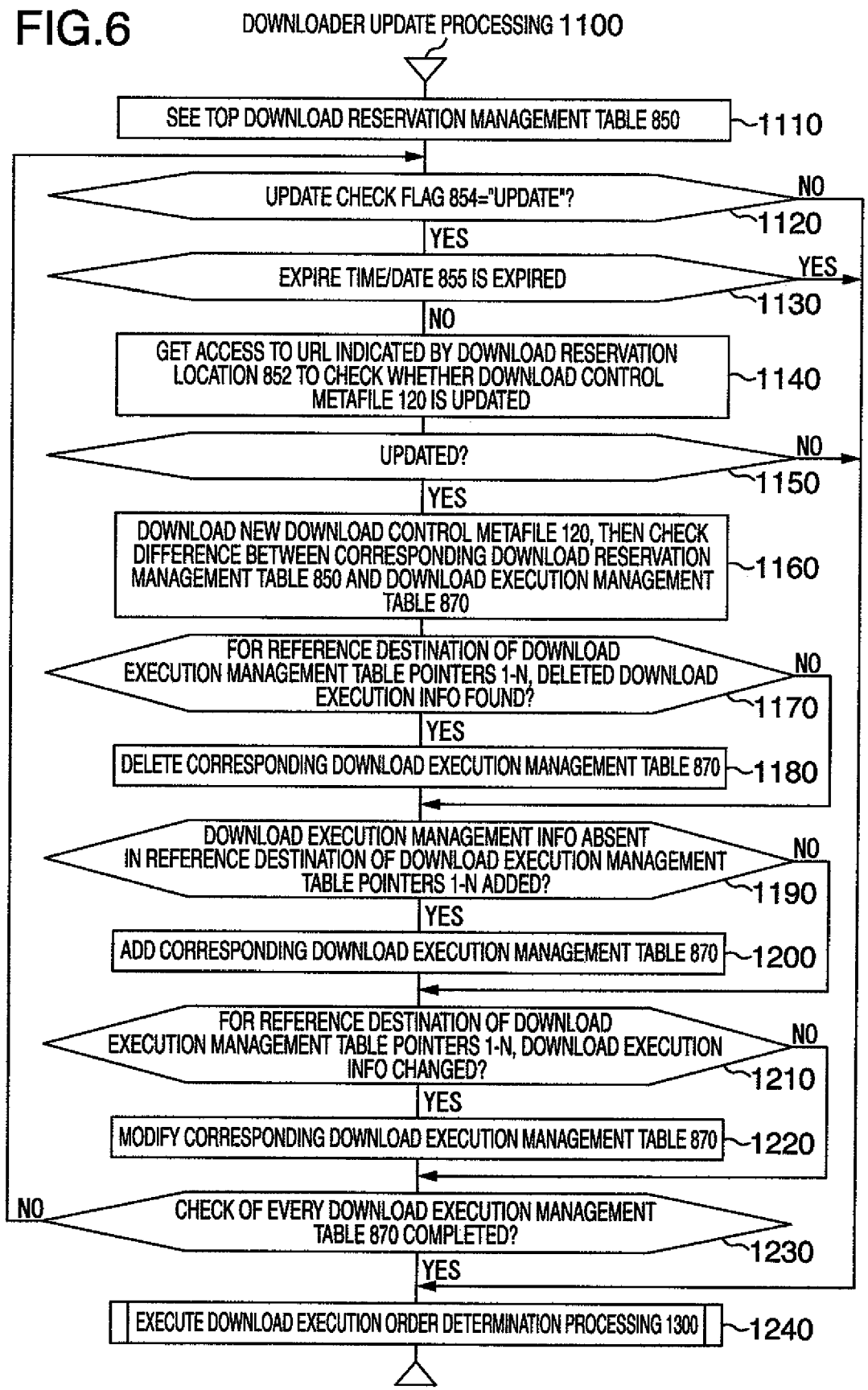
FIG. 6 A flow diagram showing an example of downloader update processing.

FIG. 6 shows a detailed example of the download update processing 1100 to be executed at 730 of FIG. 5.

The download update processing 1100 is such that in a sequential order of from the top record of the download reservation management table 850 (1110), a check is made to determine whether the value of the update check flag 854 is "Update" or not (1120). If "Update" then check whether the expire time/date 855 has a past value than the present time, i.e., whether it is expiration of limitation period or not (1130). If not the expiration of deadline, access is given to the URL that is indicated by the download reservation location 852, thereby checking whether the download control metafile 120 is updated or not (1140). If the download control metafile 120 on a server is updated (1150), a new version of download control metafile 120 is downloaded; then, check a difference between corresponding download reservation management table 850 and download execution management table 870 (1160).

As a result of the checking, whether deletion is done from the download execution information 140 is checked as to the download execution management table 870 which is a referencing destination of the download execution management table pointers 1-N (1170); if any, a record of the corresponding download execution management table 870 is deleted (1180). Next, regarding the download execution management table 870 of the referencing destination of the download execution management table pointers 1-N, an attempt is made to check whether the download execution information 140 that does not present in the presently existing download execution management table 870 is added or not (1190); if any, add a record of the corresponding download execution management table 870 (1200). Further, as for the download execution management table 870 of the reference destination of download execution management table pointers 1-N, checking is done to specify whether information is updated or not in new download execution information 140 (1210); if any updated part is found, modify a corresponding field value of the download execution management table 870 (1220).

In this way, the processing starting from the box 1120 will be repeated until the checking of every download execution management table 870 is completed (1230).

With the processing above, download control metafile update is periodically checked with respect to the server at fixed time intervals, thereby making it possible to reflect a modified portion(s) upon the database of the downloader.

The part that checks the update of the download control metafile in this way (e.g., a part of the CPU which is executed by a program) will also be called the update check unit.

Lastly, the download execution order determination processing 1300 is executed, thereby determining again the download execution order (1240).

Figure 7:
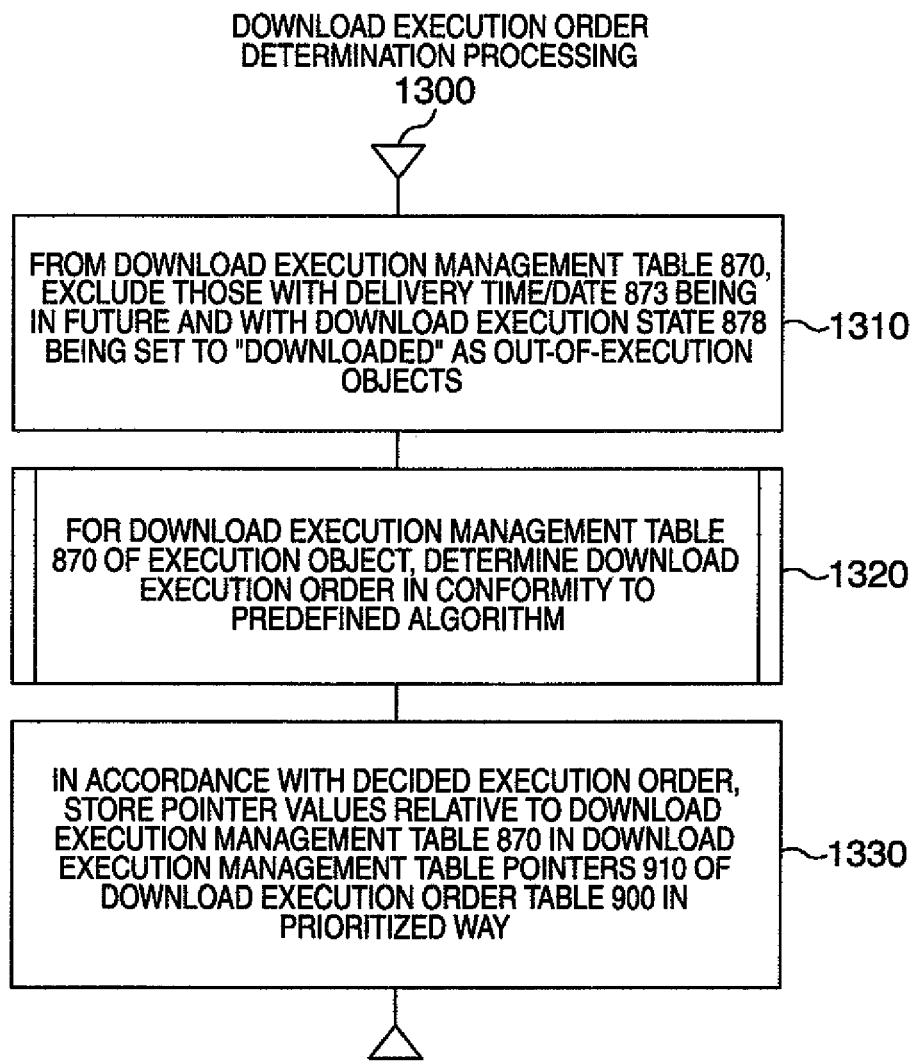
FIG. 7 A flow diagram showing an example of download execution order determination processing.

FIG. 7 shows a detailed example of the download execution order determination processing 1300 that is executed at 590 of FIG. 3. Firstly, certain ones of the download execution management table 870, including one with the delivery time/date 873 having a futural value—i.e., the one that is not delivered yet and is set in the download-reserved state—and one with the download execution state 878 being set to "Downloaded," are excluded from candidates for the execution order determination processing as not-to-be-executed objects (1310).

With respect to the remaining download execution management tables 870 to be executed, a download execution order is determined in accordance with a prespecified algorithm (1320); then, in accordance with this determined execution order, pointer values relative to the download execution management tables 870 are stored in the download execution management table pointers 910 of the download execution sequence table 900 in the priority order (1330).

As for the "prespecified algorithm" of 1320, its methodology to be implemented becomes different depending on the form of download services and/or the user's desired performance and functionality. Examples of it are algorithms (a) to (f) which follow:

(a) Contents are downloaded in the importing order of download control metafiles 120; within the same download control metafile 120, contents are downloaded in the description order of the download execution information 140.
(b) Higher priority is given to a one with the delivery content size 877 being smaller in value.
(c) Those contents belonging to a download control metafile 120 with a shorter update cycle are prioritized.
(d) In the case of an information processing apparatus capable of executing download of a plurality of contents in a parallel way, several sets of contents are downloaded simultaneously in a parallel manner.
(e) In the case of several sets of contents of (d) being simultaneously downloaded in parallel, higher priority is given to the download of one which is put on the server of a respective separate domain.
(f) The user expressly designates his or her preferred download execution order via the user interface of an information processing apparatus; then, download is performed in a way pursuant thereto.

Figure 8:
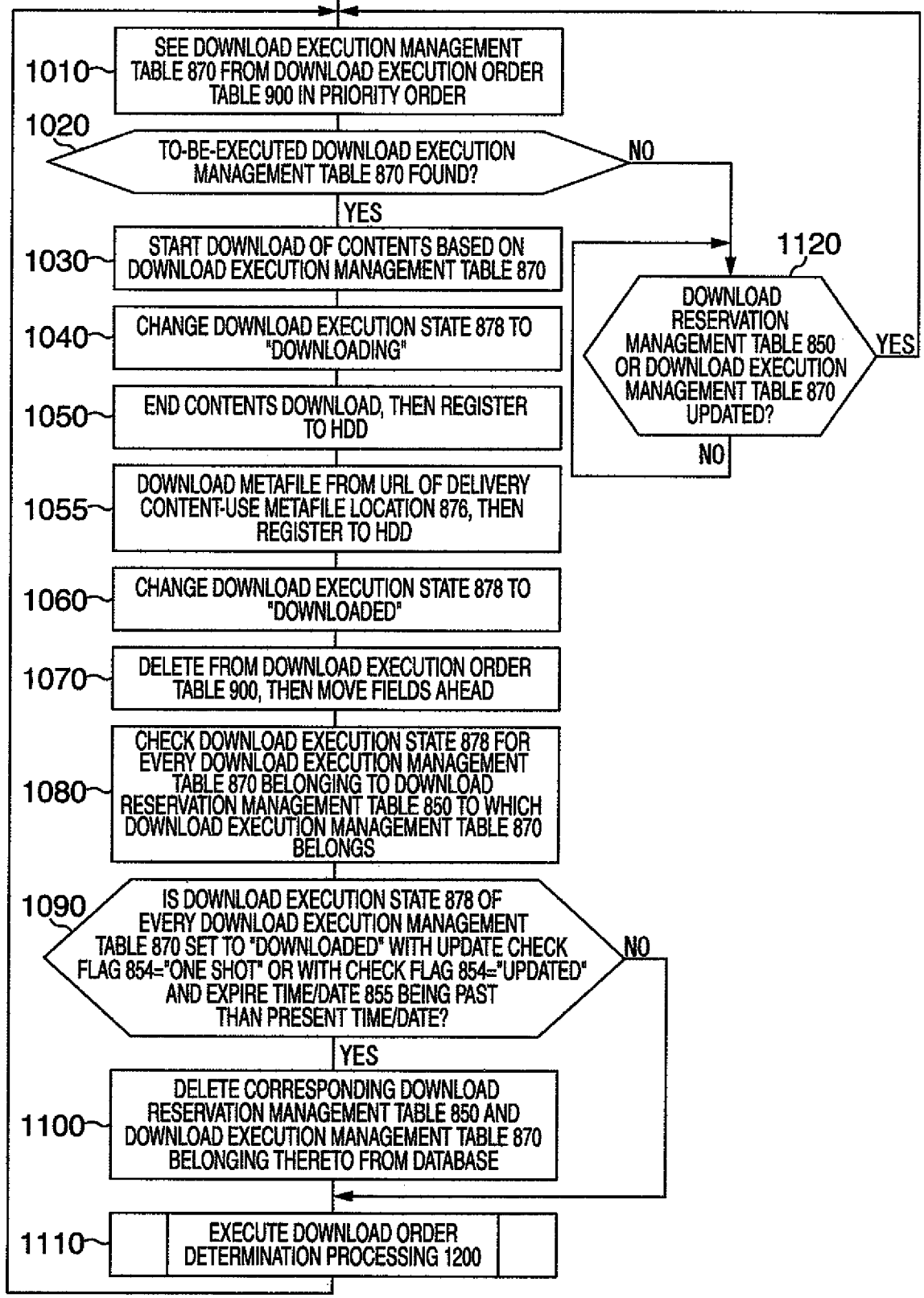
FIG. 8 A flow diagram showing an example of downloader execution processing.

FIG. 8 shows a processing example of downloader execution processing 1000 which performs the actual download processing in accordance with the download execution order table 900 that was set up by the download execution order determination processing 1300 of FIG. 7.

First of all, reference is made in the priority order to those records of the download execution management table 870 that is indicated by the download execution management table pointers 910 of the download execution sequence table 900 (1010).

If the download execution management table 870 is found (1020), the download of contents from the server gets started in accordance with the content of the download execution management table 870 (1040); then, the value of download execution state 878 is changed from the default value "Not Downloaded" to a value "Downloading" (1040).

After having completed the download of the contents, resulting in the contents being stored in HDD (1050), a related metafile needed for playback or execution of such contents is downloaded from the URL of the delivery content-use metafile location 876, and is registered to the HDD together with the contents (1055); then, the value of the download execution state 878 is changed to "Downloaded" (1060); finally, a corresponding pointer field is deleted from the download execution sequence table 900, followed by moving the remaining ones ahead (1070).

Next, reference is made to the download reservation management table 850 to which the download execution management table 870 of the download-completed contents belongs, thereby to check the download execution state 878 with respect to every download execution management table 870 belonging thereto (1080); if every download execution state 878 is set at "Downloaded" with the update check flag 854="One Shot" or with the check flag 854="Updated" and also the expire time/date 855 being past than a present time and date (1080), a decision is made to conclude that there is no need to further update the download control metafile, followed by deletion of its corresponding download reservation management table 850 and the download execution management table 870 belonging thereto from the database of the downloader (1100).

Thereafter, based on a new database, the download execution order determination processing 1300 is executed again to thereby remake a download execution order table 900 (1110); then, the processing of from the block 1010 will be executed repeatedly.

In the block 1020, if there is not any download execution management table 870 to be further executed, then wait until either the download reservation management table 850 or the download execution management table 870 is updated (1120). Upon occurrence of such updating, the processing is redone from the beginning thereof.

It is desirable that after having been started by system start-up processing, the above-stated downloader execution processing 1000 is rendered operative in at all times and repeatedly executed in background at low priority degree— in a way that it does not hinder or impede other processing— as far as the information processing apparatus is operating.

According to this embodiment, even in a case where there are a great number of same information processing apparatuses, the download update processing 1100 checks the update of download control metafiles at predetermined time intervals, while letting a per-equipment different time-and-date be as the start point thereof.

In addition, because of the execution of downloading based on the prespecified time cycle, it is possible to disperse the traffic with respect to the Web server 100 and file server 200. This makes it possible to lower costs of such servers and communication lines for connection of such servers.

It is also possible to automatically delete monitoring-unnecessitated download control information from the database information of the downloader 550 to thereby ensure that unnecessary files are no longer stored in HDD 450 infinitely.

Although the invention has been described with reference to currently preferred embodiments thereof, this invention should not exclusively be limited thereto, and it will be apparent to those skilled in the art that various changes and modifications may be made therein without departing from the spirit and scope of the appended claims.

DESCRIPTION OF REFERENCE NUMERALS

120 Download Control Metafile
134 Update Check Flag
135 Expire Time-and-Date
210 Contents
400 Information Processing Apparatus
450 Hard Disk Drive
460 Real Time Clock
500 Web Browser
550 Downloader
600 System Initial Setup Processor
700 Timer Interrupt Processing
800 Downloader Management Information
850 Download Reservation Management Table
870 Download Execution Management Table
900 Download Execution Order Table
1000 Downloader Execution Processing
1100 Downloader Update Processing
1300 Download Execution Order Determination Processing

The invention claimed is:

1. A method for downloading content by a download control apparatus which includes a receiving unit, a check unit and a processor for executing the steps of the receiving unit and the check unit, comprising the steps of:

receiving, by the receiving unit, download control meta information that includes meta location information indicating a location of the download control meta information, content location information indicating a location of content, update check information indicating whether or not to check for an update to the download control meta information that is located at the location indicated in the meta location information and expiration time information indicating a time of whether or not an update of the download control meta information is checked;

receiving the content from the location indicated by the content location information;

in a case where the update check information indicates to check for an update to the download control meta information that is located at the location indicated in the meta location information, checking, by the check unit, whether the download control meta information in the location indicated by the meta location information has been updated; and when the download control meta information has been updated and when information of the content has been added in the updated download control meta information, receiving the content indicated in the updated download control meta information.

* * * * *